United States Patent [19]

Thompson

[11] Patent Number: 5,004,603

[45] Date of Patent: Apr. 2, 1991

[54] FEEDING LIVESTOCK

[75] Inventor: Barry A. Thompson, 4 Gilstrap Close, Beacon Heights, Newark Notts., United Kingdom

[73] Assignees: Rene Pich; Hubert Issaurat, both of France; Barry A. Thompson, United Kingdom

[21] Appl. No.: 24,575

[22] Filed: Mar. 11, 1987

[30] Foreign Application Priority Data

Mar. 11, 1986 [GB] United Kingdom ............... 8605969
Apr. 25, 1986 [GB] United Kingdom ............... 8610199
Jul. 8, 1986 [GB] United Kingdom ............... 8616564

[51] Int. Cl.$^5$ ............... A61K 31/78; A61K 9/50; A23K 1/18
[52] U.S. Cl. ............... 424/81; 424/438; 424/501
[58] Field of Search ............... 424/81, 438, 501

[56] References Cited

U.S. PATENT DOCUMENTS

| | | | |
|---|---|---|---|
| 3,829,564 | 8/1974 | Merry et al. | 424/438 |
| 3,957,973 | 5/1976 | Yamaguchi | 424/81 |
| 3,997,482 | 12/1976 | Turkova et al. | 424/81 |
| 4,328,208 | 5/1982 | Kurbanov et al. | 424/81 |
| 4,473,575 | 9/1984 | Drake et al. | 424/438 |
| 4,687,676 | 8/1987 | Wu et al. | 424/438 |

*Primary Examiner*—Stanley J. Friedman
*Assistant Examiner*—Kevin Weddington
*Attorney, Agent, or Firm*—Richard R. Mybeck

[57] ABSTRACT

Ruminants are fed a water-insoluble polymer, which may be swollen (i.e. having absorbed water to form a gel) or unswollen. At least 0.04 kg of (swollen) polymers per day per 100 kg body weight is administered, and the polymer has not necessarily been used as a substrate for the preparation of feedstuff.

Such methods are particularly advantageous when the animal is being fed on a diet causing acid conditions in the rumen, such as a diet of silage.

A useful polymer is ammonium polyacrylate cross-linked by about 500 ppm methylene bisacrylamide ("MBA").

The polymers enhance feed conversion rates and hence lower the effective cost of feeding the animals.

21 Claims, No Drawings

FEEDING LIVESTOCK

INTRODUCTION

This invention relates to methods and compositions for use in feeding ruminants.

BACKGROUND OF THE INVENTION

Water-swellable polymers are well-known. There is now the class of "super-absorbent" polymers derived from, for example, (meth)acrylic monomers. They may be provided in the form of flakes or beads which can absorb water and swell by a very large factor, to give swollen beads. Such materials are used in disposable nappies.

If the monomers are polymerized to form long chains and the chains are simply mixed with one another, then, depending upon the monomer and the chain length, the polymer is often water-soluble. If, however, the chains are cross-linked to one another, then the resulting mass is insoluble but may still absorb large quantities of water to form a gel.

In the context of animal feeds, it is known, for example from U.S. Pat. No. 3,957,973, to administer soluble polyacrylamide to pigs. The effect is said to be increased food residence time, which prevents gastric ulcers and pica.

FR-A-2,074,603 discloses the use of a wide variety of polymeric substances in an animal's feed to lower the blood cholesterol level of the animal. This prior teaching is apparently applicable to all warm-blooded animals but is especially useful in the context of chickens and pigs. The polymer may be soluble or insoluble in water.

SUMMARY OF THE INVENTION

It has now surprisingly been discovered that certain polymers increase feed conversion rates when fed to reminants.

According to a first aspect of the present invention, a method for feeding ruminants comprises administering to the ruminants an unswollen or (preferably) swollen water-swellable water-insoluble polymer material.

The terms "unswollen" and "swollen" refer to the extent to which the polymer has taken up water. A wide variety of polymers of differing absorption capacities may be used, although it has been found that polymers which can take up at least 10 times their own weight of water are the most useful.

The amount of polymer which is administered is, or is equivalent to, preferably at least 0.3 kg, more preferably 0.5 to 10 kg, and most preferably 1.5 to 5 kg, swollen polymer per animal per day. These figures are especially suitable in the case of administration to cows, and are based on the use of a polymer of which 2 to 20 g (depending on the water hardness) take up c. 1 liter of water, i.e. to give 1 kg of swollen polymer. An average adult cow's body weight is 550–650 kg, and corresponding figures may be derived for other animals such as goats (5–50 kg, reduction factor 50–90%) or sheep (5–100 kg, reduction factor 50–75%). Too much polymer will either not be eaten by the animal or will replace nutritious feedstuffs in a disadvantageous way. Too much unswollen material is undesirable, as otherwise the polymer may swell too much in the rumen and cause the animal discomfort. The skilled man will readily be able to determine the optimum feeding regime.

When feedstuffs for animals are grown hydroponically, swollen polymers are sometimes used as a substrate and it is thought that on occasions the polymer, by then substantially exhausted of water, may have been included in the feed, although at very low levels.

According to a second aspect of the present invention, an animal feed supplement comprises a swollen water-swellable polymer, in which the polymer has not served as a substrate for preparation of feedstuff and/or is substantially fully swollen (i.e. contains at least 40% preferably 50%, 60%, 70%, 80% or 90% of its maximum water uptake).

The method of the present invention has been found to be particularly advantageous when the animals are fed on silage and/or cereals, but less advantageous when the animals are on open pasture. Without wishing necessarily to be bound by any explanation of the mechanism of the invention, it is thought that diets which create acid conditions in at least part of the rumen are those which allow the methods of the present invention to exert their maximum effect. The rumen normally has a pH of about 7, but this may drop, at least transiently, after the animal is fed certain materials such as cereals.

Accordingly, preferred methods of the present invention are those in which the ruminant is being maintained on a diet causing relatively acidic conditions in at least part of the rumen, for example a pH of about 5.5, 5.0, 4.5, 3.5, 3.0 or lower.

It is possible that the polymer gel provides a haven of relatively normal pH (i.e. pH about 6.0–8.5) for desirable rumen bacteria which would otherwise not tolerate the low pH of the rumen of a ruminant being fed silage or other acidic material.

Thus, another aspect of the invention provides a composition comprising a swollen water-insoluble polymer having an aqueous environment of pH about 6.0–8.5, and desirable rumen micro-organisms in or adjacent such environment. Preferably, the pH of the swollen polymer is 6.5 to 8.0, most preferably about 7.0 to 7.5.

Feedstuff and polymer may be co-administered. A farmer may wish to monitor the usage of both conventional fodder and polymer independently, and it is in any case a very simple matter to introduce that constituent of the mixture and then the polymer to the animal's trough or other eating point, perhaps in or adjacent a stall. The polymer can be swollen (if desired) shortly before use, again very simply. Alternatively, unswollen polymer can be mixed and pelleted with fodder before use, in conventional manner. The polymer may be simply sprinkled onto the usual foodstuffs, or it may be mixed with it. However, it is preferred for unswollen polymer not be administered in such a way as to cause acid liquid to be drawn into the gel. Thus, polymer which has the capacity to swell further will not normally be administered simultaneously with silage, other acidic material or other materials, such as cereals, which create acid conditions in the rumen. Unswollen polymers may be given to an animal on an acidic diet, for example silage, but should preferably be co-administered with water, brewery wastes or other non-acidic material. The mechanism of the swellable polymer's effect is unclear, but it may aid digestion, kill undesirable bacteria and/or provide a substrate for desirable bacteria, e.g. those which break down the feedstuff, e.g. silage.

The precise nature of the polymer may not be critical, provided that it has no undesirable degree of toxicity to mammals or to desirable gut bacteria, is water-insoluble and absorbs at least 10 times its own weight of water. Suitable polymers may be derived from monomers such as (meth)acrylic acid and (meth)acrylamide. The monomers or unlinked polymers should be insoluble. Alternatively, the monomers or polymers are soluble, but are corss-linked to be insoluble. Classes of polymer which may be of utility are polyvinyl alcohol, methacrylate-polystyrene, starch-acrylonitrile and polyalkylene oxides. The polymer may be a homopolymer or copolymer, e.g. a graft copolymer. Sodium, potassium or ammonium poly(meth)acrylates may be used; sodium/potassium may itself be valuable as a component administered to the animals. Particular polymers include ammonium polyacrylate cross-linked by 500 ppm methylene bisacrylamide ("MBA") (available from SNF, St. Etienne, France as PB48C); a copolymer of acrylamide and sodium acrylate (70/30) cross-linked by 500 ppm MBA (PR3005); sodium polyacrylate cross-linked by 50 ppm MBA (PR9910); sodium polyacrylate cross-linked by 30 ppm MBA and post-treated with 0.2% ethylene glycol diepoxy (PR9910T); a copolymer of acrylamide and potassium acrylate (70/30) cross-linked by 20,000 ppm ethylene glycol dimethacrylate (OL610); a copolymer of sodium acrylate and vinyl alcohol (70/30) (available from Sumitomo); polyethylene oxide cross-linked by gamma rays; starch grafted with acrylonitrile and saponified; starch grafted with acrylic acid; and a copolymer of acrylamide and dimethyldiallylammonium chloride (95/5) cross-linked by 500 ppm MBA.

Ammonium polyacrylate cross-linked with about 500 ppm of methylene bisacrylamide is preferred.

The polymers may be anionics such as polymers of acrylic acid, methacrylic, crotonic, sulphopropylic, vinyl sulphonic or styrene sulphonic; nonionics such as polymers of acrylamide, methacrylamide, acrylic esters, vinyl alcohol, vinylacetates, or polyethylene oxide; cationics such as dimethylaminoethyl acrylate or methacrylate salts dimethyldiallylammonium chloride; or copolymers of these water-soluble monomers between them or with some insoluble monomers.

These polymers swell in water but do not dissolve because they are cross-linked by (a) monomers with 2, 3 or 4 double bonds, such as ethylene glycol diacrylate or dimethacrylate, methylenebisacrylamide or methacrylate or polyethylene glycol dimethacrylate; (b) by reactive compounds like formaldehyde, glyoxal, amino resins like Kymine (epichlorhydrin, diethylenetriamine, adipic acid) glycol diglycidylether; (c) by gamma or beta rays; or (d) by polyvalent metals like aluminium, iron and the like.

Such materials may take up water and swell by a factor (w/w) of at least 10, e.g. 20 or more, and often 50, 100, 200, 400, 500, 800, 1000, 1200, 1500 or more.

Preferably, the polymer is such that when clean water is absorbed by it, the pH of the swollen polymer is about 7.0 or more. Some polymers are such as to change the pH of the water which is added. Thus, it is the pH of the swollen polymer which is important, not the acidity or alkalinity of the unswollen polymer. If the water and polymer are, in combination, too acidic, then the pH of the water should be raised before it is added to the polymer, for example by simply mixing in some lime, bicarbonate or the like.

Flavourings, vitamins and/or minerals may be added to the polymer before or concomitantly with the addition of the water.

DETAILED DESCRIPTION OF PREFERRED EMBODIMENTS

A preferred example of the invention will now be described by way of example.

EXAMPLE

Twenty five Hereford cross Friesian steers weighing between 400 and 450 kg liveweight were purchased from a wide range of commercial sources. They were all implanted with 36 mg Ralgro (Crown Chemical Co., Lamberhurst, Kent) and weighed on arrival. They were allocated on a weight basis to five groups of five animals.

Two groups formed controls and were not fed any gel. Three groups were given gel A at the level of 1.5, 2.5 or 3.5 kg per day. Weights of gel are on an as fed basis. "Gel A" is available from S.N.F., St. Etienne, France, as PB48C and is ammonium polyacrylate cross-linked by 500 ppm of methylene bisacrylamide.

The gel was prepared in plastic tanks by adding 9 g of polymer to each liter of water required, 16 hours before feeding. All animals were fed each morning on silage (Table 1) to appetite and beef nuts containing 830 g/kg barley, 120 g/kg soya bean meal and 50 g/kg mineral and vitamin supplement for a period of eight weeks. Silage refusals were weighed first, then the day's silage allocation was given to each group and the beef nuts placed on top of the silage. The gels were fed to the animals by pouring them over the beef nuts using a graduated plastic bucket to measure the amount. In order to provide a range of fermentation conditions in the rumen, two levels of beef nuts were used. These were 1.5 kg per day and 3 kg per day. Each group was assigned to one of these levels at random and changed to the other level after four weeks.

Intake of silage was recorded daily for each group. Samples of silage and beef nuts were taken every two weeks for Proximate analysis. Each animal was weighed every two weeks and a sample of rumen fluid taken by stomach tube for volatile fatty acid and pH determination. A faecal sample was taken by grab sampling during week 6 of the trial to determine the digestibility of the ration.

Data for liveweight and liveweight gain were analysed by analysis of variance between groups and using the residual mean squares to compare treated groups with their appropriate control by Student's t-test. Food conversion ratios were calculated by dividing the mean dry matter or metabolisable energy intake for each group by its means liveweight gain. The apparent metabolisable energy concentrations of the whole ration and the silage portion were calculated for each group using equations from MAFF ("Energy Allowances and Feeding Systems for Ruminants", Bulletin 33, HMSO, London, 1975) and ARC ("The Nutritional Requirements of Ruminant Livestock" Commonwealth Agric. Bureaux, Slough, 1980) according to the method given as shown below.

Calculation of Apparent Energy Concentration of The Ration and Metabolisable Energy Content of Silage 1. Calculate average weight for each period (W) by taking the mean of the starting and finishing weights for that period.

$$W = \frac{(WT0 + WT1)}{2}$$

2. Using W and the liveweight gain for the period (LWG) calculate the energy content of the liveweight gain ($E_g$) using the equation from ARC (1980), supra.

$$E_g = \frac{(4.1 + 0.0332W - 0.000009W^2)}{(1 - 0.1475LWG)} \times LWG$$

3. Calculate metabolisable energy requirement for maintenance ($M_m$) from W using equation 4 from MAFF (1975), supra.

$$M_m = \frac{(5.67 + 0.061W)}{0.72}$$

4. Accepting the method of MAFF (1975) to derive their equation 30 but removing the 5% safety margin, apparent energy concentration of the ration (M/D) can be calculated from $M_m$, $E_g$ and dry matter intake (DMI) using the equation $$M/D = \frac{M_m + \sqrt{[M_m^2 + (92DMI \times E_g)]}}{2DMI}$$

5. The apparent energy content of silage can be calculated from $$ME_{silage} = \frac{(M/D \times DMI - (12.17 \times 0.8765 \times BN)}{\text{silage intake} \times 0.317}$$

where BN is the level of Beef Nuts fed.

The average liveweight gain for each group is shown below in Table 4. Means are presented for the first four weeks, the last four weeks and the whole trial period.

All treated groups grew better than the control groups over the first four weeks except group A3.5. This group was however compared with the better of the control groups.

Conversion of Dry Matter and Energy Into Liveweight Gain

Food conversion ratio, expressed as dry matter intake per kilogram of liveweight gain, is shown for each group in Table 6. The reciprocal of this figure gives a measure of efficiency. All groups were more efficient than the control groups over the first month. All groups except A2.5 were more efficient than controls over the second month. When the figures for the whole trial are considered, all treated groups were more efficient than even the most efficient control group.

Conversion of metabolisable energy into liveweight gain, expressed as energy intake per kilogram of liveweight gain, follows the same patteren as food conversion ratio.

Using accepted energy standards and the energy content of the silage calculated from laboratory analysis, the liveweight gains found for control animals correspond with predicted values. However, all treated groups grew at a faster rate than predicted. This suggests that the treated groups were utilizing food more efficiently than control groups. When the observed performances and intakes are used to calculate the apparent metabolizable energy content of silage, this does appear to be the case. The values obtained for energy content of silage agree with those predicted from laboratory analysis for the control groups but are much higher for the treated groups.

The pertinent data accumulated from the foregoing trials are reported in Tables 1-6.

TABLE 1

| Analysis of Silage | | |
| --- | --- | --- |
| Dry matter | (g/kg) | 317 |
| pH | | 4.1 |
| MADF | (g/kg DM) | 323 |
| Crude protein | (g/kg DM) | 129 |
| Ammonia Nitrogen | (% N) | 4.8 |
| D value | | 65 |
| Metabolisable Energy | (MJ/kg DM) | 10.4 |
| DCP | (g/kg DM) | 82 |

TABLE 2

| Allowance of beef nuts (kg/day) for each group | | |
| --- | --- | --- |
| Group | 1st Month | 2nd Month |
| C1 | 1.5 | 3 |
| C2 | 3 | 1.5 |
| A1.5 | 3 | 1.5 |
| A2.5 | 1.5 | 3 |
| A3.5 | 1.5 | 3 |

TABLE 3

| Mean liveweight (kg) for each group (5 steers per group) | | | | | |
| --- | --- | --- | --- | --- | --- |
| | Group | | | | |
| Liveweight at: | C1 | C2 | A1.5 | A2.5 | A3.5 |
| start | 414 | 413 | 421 | 416 | 420 |
| changeover | 455 | 448 | 473 | 463 | 458 |
| end | 492 | 477 | 512 | 493 | 503 |

TABLE 4

| Mean liveweight gain (kg/day) for each group (5 steers per group) | | | | | | |
| --- | --- | --- | --- | --- | --- | --- |
| | beef nuts | Group | | | | |
| | level | C1 | C2 | A1.5 | A2.5 | A3.5 |
| Month 1 | 1.5 | 1.46 | | | 1.71 | 1.38 |
| | 3 | | 1.24 | 1.86 | | |
| Month 2 | 1.5 | | 1.04 | 1.37 | | |
| | 3 | 1.31 | | | 1.06 | 1.59 |
| Overall | 2.25 | 1.39 | | | 1.39 | 1.49 |
| | 2.25 | | 1.14 | 1.62 | | |

TABLE 5

| Mean silage intake (kg/day) for each group (5 steers per group) | | | | | | |
| --- | --- | --- | --- | --- | --- | --- |
| | beef nuts | Group | | | | |
| | level | C1 | C2 | A1.5 | A2.5 | A3.5 |
| Month 1 | 1.5 | 24.9 | | | 23.5 | 21.9 |
| | 3 | | 21.4 | 22.0 | | |
| Month 2 | 1.5 | | 24.3 | 27.4 | | |
| | 3 | 26.8 | | | 22.7 | 25.9 |
| Overall | 2.25 | 25.9 | | | 23.1 | 23.9 |
| | 2.25 | | 22.9 | 24.7 | | |

TABLE 6

| Mean food conversion ratio (kg DMI/kg LWG) for each group (5 steers per group) | | | | | | |
| --- | --- | --- | --- | --- | --- | --- |
| | beef nuts | Group | | | | |
| | level | C1 | C2 | A1.5 | A2.5 | A3.5 |
| Month 1 | 1.5 | 6.31 | | | 5.13 | 5.98 |
| | 3 | | 7.60 | 5.16 | | |
| Month 2 | 1.5 | | 8.71 | 7.29 | | |

TABLE 6-continued

| | beef nuts level | Group | | | | |
|---|---|---|---|---|---|---|
| | | C1 | C2 | A1.5 | A2.5 | A3.5 |
| Overall | 3 | 8.50 | | | 9.28 | 6.82 |
| | 2.25 | 7.32 | | | 6.70 | 6.41 |
| | 2.25 | | 8.10 | 6.04 | | |

Mean food conversion ratio (kg DMI/kg LWG) for each group (5 steers per group)

It is understood that such modifications, alterations and adaptations, as may readily occur to the artisan skilled in the field to which this invention pertains when confronted with this specification, are intended within the spirit of the present invention which is limited only by the scope of the claims appended hereto.

Accordingly, what is claimed is:

1. A method of feeding a ruminant comprising administering to said ruminant a feed-conversion rate increasing non-toxic amount of a swollen water swellable water insoluble polymer material in an amount equivalent to at least 0.04 kg swollen polymer per day per 100 kg ruminant body weight.

2. A method according to claim 1 in which said polymer material is swollen water swellable water-insoluble polymer.

3. A method according to claim 1 in which said ruminant is being maintained on a diet which creates a relatively acid condition in at least part of the rumen.

4. A method according to claim 3 in which the pH of said part is, at least transiently, less than about 6.0.

5. A method according to claim 4 in which said pH is, at least transiently, less than about 5.0.

6. A method according to claim 3 wherein the ruminant is being fed a diet with a high cereal or silage content.

7. A method according to claim 1 in which said ruminant is bovine.

8. A method according to claim 1 in which said polymer is selected from the group consisting of ammonium polyacrylate cross-linked by 500 ppm MBA; a copolymer of acrylamide and sodium acrylate (70/30) cross-linked by 500 ppm MBA; sodium polyacrylate cross-linked by 30 ppm MBA and post-treated with 0.2% ethylene glycol diepoxy; a copolymer of acrylamide and potassium acrylate (70/30) cross-linked by 20,000 ppm ethylene glycol dimethacrylate; a copolymer of sodium acrylate and vinyl alcohol (70/30) and polyethylene oxide cross-linked by gamma rays; starch grafted with acrylic acid; and a copolymer of acrylamide and dimethyldiallylammonium chloride (95/5) cross-linked by 500 ppm MBA.

9. A method according to claim 8 in which each said ruminant is administered from at least about 0.3 kg up to about 10 kg of swollen polymer equivalent per day.

10. The method of feeding a ruminant comprising administering to such ruminant a feed-conversion-increasing effective non-toxic amount of a water-swellable water-insoluble polymer selected from the group consisting of ammonium polyacrylate cross-linked by 500 ppm MBA; a copolymer of acrylamide and sodium acrylate (70/30) cross-linked by 500 ppm MBA; sodium polyacrylate cross-linked by 30 ppm MBA and post-treated with 0.2% ethylene glycol diepoxy; a copolymer of acrylamide and potassium acrylate (70/30) cross-linked by 20,000 ppm ethylene glycol dimethacrylate; a copolymer of sodium acrylate and vinyl alcohol (70/30) and polyethylene oxide cross-linked by gamma rays; starch grafted with acrylic acid; and a copolymer of acrylamide and dimethyldiallylammonium chloride (95/5) cross-linked by 500 ppm MBA.

11. A method according to claim 8 in which said polymer is ammonium polyacrylate cross-linked by 500 ppm MBA.

12. A method according to claim 11 in which each said ruminant is administered from at least about 0.3 kg up to about 10 kg of swollen polymer equivalent per day.

13. A method according to claim 1 in which each said ruminant is administered from at least about 0.3 kg up to about 10 kg of swollen polymer equivalent per day.

14. A method according to claim 1 in which said polymer is capable of absorbing at least ten times its own weight in water.

15. A method according to claim 9 in which said polymer is capable of absorbing at least ten times its own weight in water.

16. A method according to claim 8 in which said polymer is capable of absorbing at least ten times its own weight in water.

17. A method according to claim 15 in which said polymer provides an aqueous environment having a pH in the range from about 7.0 to about 7.5 and contains desireable rumen micro organisms in or adjacent to said environment.

18. A method according to claim 16 in which said polymer provides an aqueous environment having a pH in the range from about 7.0 to about 7.5 and contain desireable rumen micro organisms in or adjacent to said environment.

19. A method according to claim 8 in which at least one flavoring, vitamin or mineral having nutritional value is admixed within said polymer.

20. A method according to claim 16 in which said polymer comprises ammonium polyacrylamide cross-linked with about 500 ppm of methylene bisacrylamide.

21. A method according to claim 14 in which said polymer provides an aqueous environment having a pH in the range from about 7.0 to about 7.5 and contains desireable rumen micro organisms in or adjacent to said environment.

* * * * *